United States Patent Office 3,276,072
Patented Oct. 4, 1966

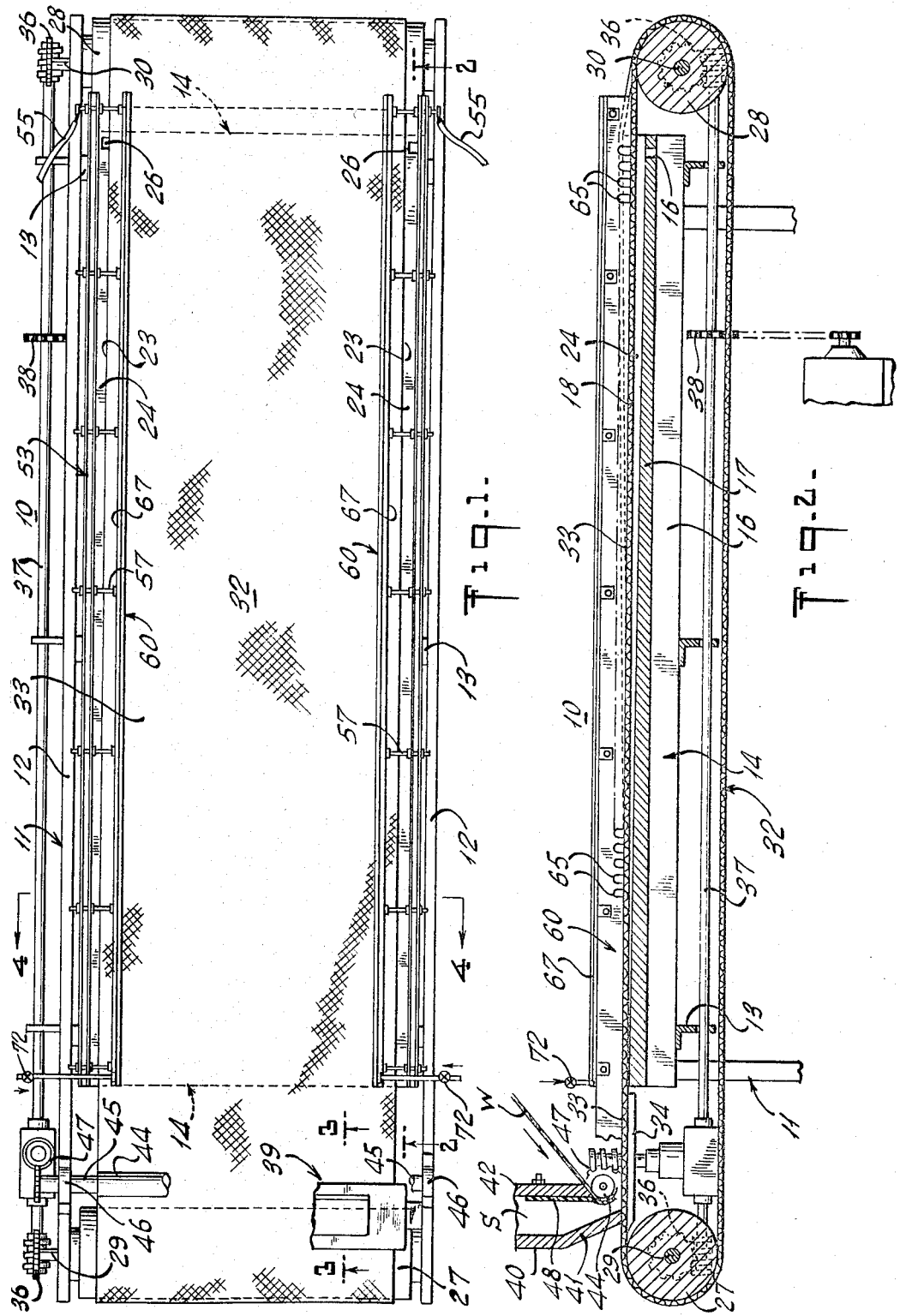

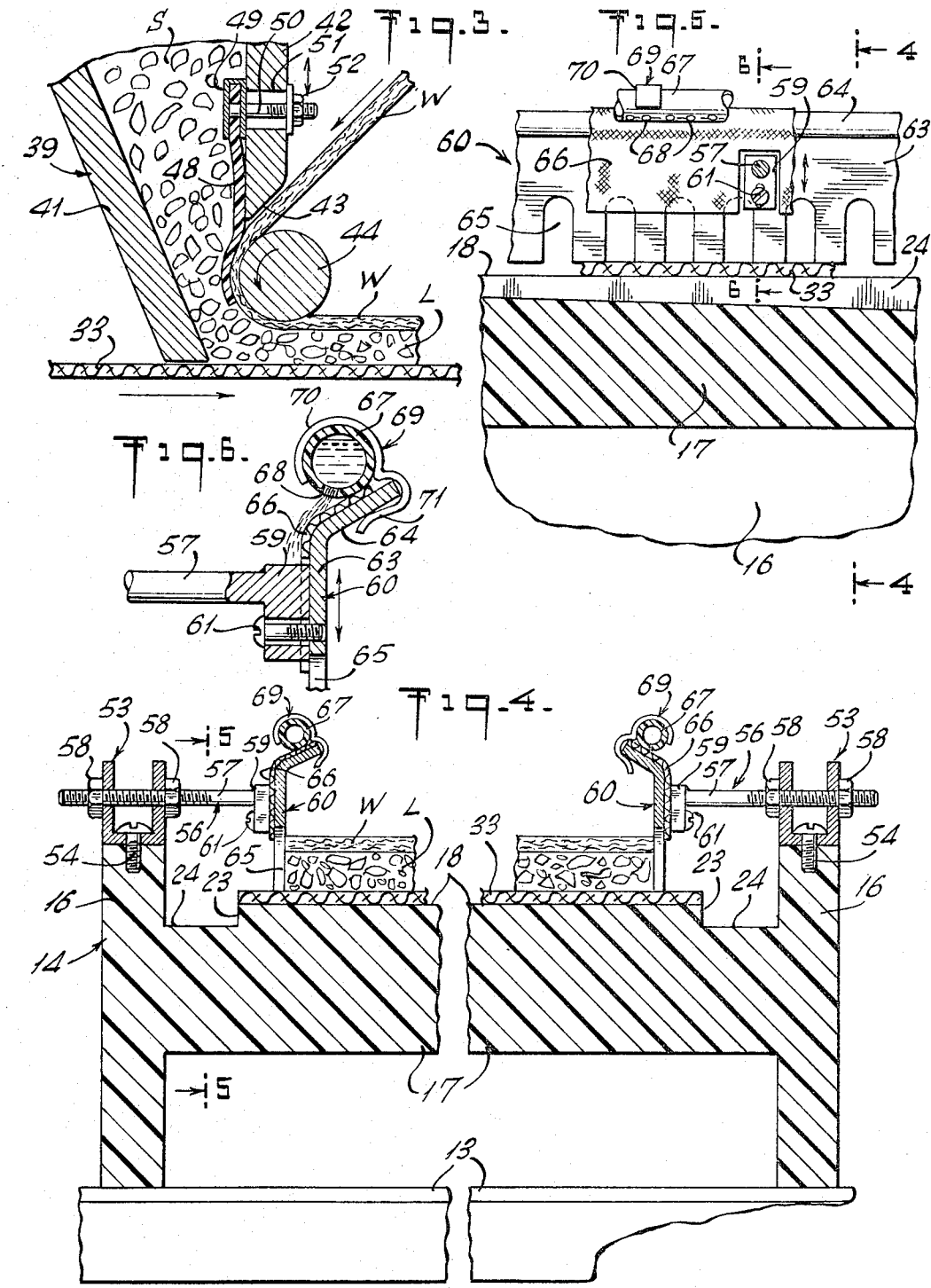

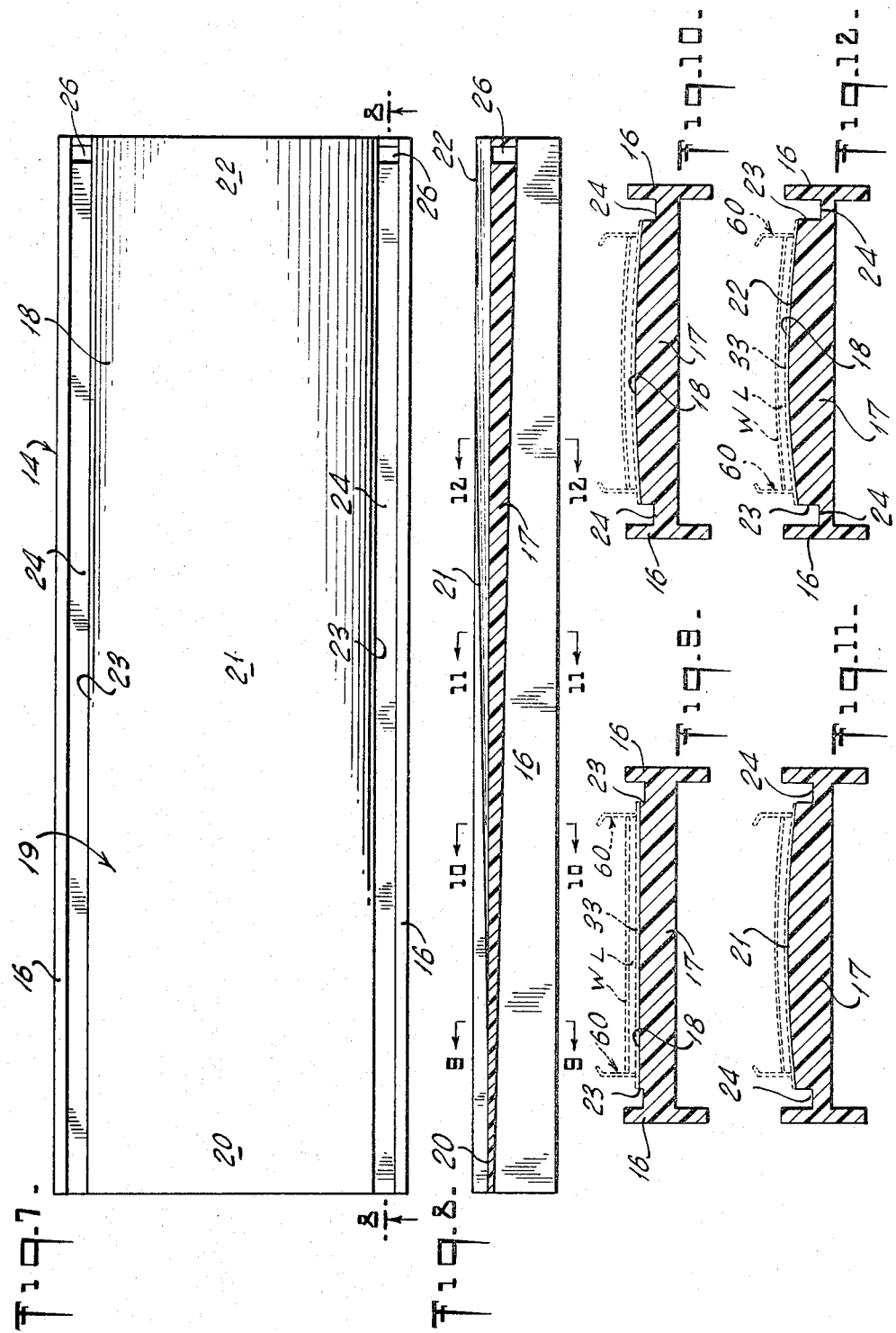

3,276,072
APPARATUS FOR FORMING REGENERATED
CELLULOSE SPONGE
Alfred Politzer, James Teng, and Frank Pekarek, Cleveland, Alvin B. Shockley, Berea, Albert Siebrecht, Lakewood, and Pao-Chi Wang, Cleveland, Ohio, assignors to Nylonge Corporation, Cleveland, Ohio, a corporation of Ohio
Filed Sept. 11, 1963, Ser. No. 308,212
18 Claims. (Cl. 18—4)

The present invention relates generally to improvements in methods and apparatus for the manufacture of sponge products and it relates more particularly to an improved method and apparatus for the continuous production of a composite web of regenerated cellulose sponge and a lofty non-woven fibrous mat.

A composite cleaning device possessing highly desirable properties and a method of producing such a device are disclosed in U.S. Patent No. 3,080,688, granted March 12, 1963, to Alfred Politzer. The composite cleaning device comprises a layer of regenerated cellulose sponge and a layer or mat of a lofty non-woven fibrous abrasive material superimposed on the sponge layer and anchored thereto by the mat fibers at the sponge mat interface being imbedded in the sponge layer, said interface being highly liquid pervious. In the U.S. Patent No. 3,109,703, granted November 5, 1963, to Alfred Politzer et al, and in U.S. Patent No. 3,142,714 granted July 28, 1964, to Alfred Politzer et al., there are disclosed methods and apparatus for the continuous production of the cleaning devices disclosed in the above-identified Politzer patent. While the methods and equipment disclosed in the aforesaid patents are highly satisfactory, they possess some drawbacks which may adversely affect the uniformity of the end product and the efficiency of the process and apparatus. In the fabrication of the composite cleaning device a layer of a sponge forming mass comprising viscose and admixed particulate sodium sulphate decahydrate and reinforcing fibers is deposited on an endless belt and a web of the non-woven fibrous mat is superimposed on the sponge mass layer and partially pressed therein. As the sponge mass layer and mat are transported by the conveyor belt, electric current is passed through the sponge mass by means of longitudinally extending electrodes disposed along opposite sides of the mass to effect the heating of the viscose and the coagulation thereof and the regeneration of the cellulose and the melting of the sodium sulphate decahydrate. Many difficulties have been encountered in the above process. The sponge forming mass is a heterogeneous mixture and the maintenance of uniform process control has been, at best, difficult, particularly in the coagulation of this mass. As the temperature of the sponge mass is raised by the internal electric resistance heating thereof, the crystals of sodium sulphate melt to produce throughout the mass an electrical conduction sodium sulphate solution which greatly effects the electrical characteristics of the sponge mass. It has been observed that occasionally different sections of the advancing sponge mass vary in their process conditions and temperatures across the width thereof and as a consequence portions of the sponge mass may be overheated and burned whereas other portions may be insufficiently heated. Burning has been frequently observed along the faces of the electrodes and excessive boiling has occurred in various areas which not only is detrimental to the resulting sponge layer, but also adversely effects the overlying fibrous mat. Another drawback encountered with the earlier equipment and methods resides in the anchoring of the fibrous mat to the sponge layer. The interconnection of the layers and the disposition of the fibrous mat has occasionally left something to be desired.

It is, therefore, a principal object of the present invention to provide an improved method and apparatus for the manufacture of sponge products.

Another object of the present invention is to provide an improved method and apparatus for producing composite cleaning devices comprising interconnected superimposed layers of regenerated cellulose sponge and lofty non-woven fibrous abrasive webs.

Still another object of the present invention is to provide an improved apparatus for the continuous electrical coagulation of viscose sponge forming masses.

A further object of the present invention is to provide an improved method and apparatus for effecting the uniform anchoring of a web of a lofty non-woven fibrous mat to a regenerated cellulose sponge.

Still a further object of the present invention is to provide an improved method and apparatus of the above nature characterized by their ruggedness, simplicity, reliability, versatility and relative high capacity and low cost.

The above and other objects of the present invention will become apparent from a reading of the following description taken in conjunction with the accompanying drawing, wherein:

FIGURE 1 is a top plan fragmentary view of an apparatus embodying the present invention;

FIGURE 2 is a sectional view taken along line 2—2 in FIGURE 1;

FIGURE 3 is an enlarged detailed fragmentary sectional view taken along line 3—3 in FIGURE 1;

FIGURE 4 is a sectional view taken along line 4—4 in FIGURES 1 and 5;

FIGURE 5 is a fragmentary sectional view taken along line 5—5 in FIGURE 4;

FIGURE 6 is an enlarged detailed sectional view taken along line 6—6 in FIGURE 5;

FIGURE 7 is a top plan view of the conveyor upper run support member;

FIGURE 8 is a sectional view taken along line 8—8 in FIGURE 7;

FIGURE 9 is a sectional view taken along line 9—9 in FIGURE 8;

FIGURE 10 is a sectional view taken along line 10—10 in FIGURE 8;

FIGURE 11 is a sectional view taken along line 11—11 in FIGURE 8; and

FIGURE 12 is a sectional view taken along line 12—12 in FIGURE 8.

In one sense the present invention contemplates the provision of a material treating apparatus comprising an endless conveyor having a longitudinally extending, transversely upwardly crowned upper run and including a trailing section and a leading section, means for advancing said belt along said upper run from said trailing section toward said leading section, means for depositing a material on said belt at said trailing section, and a pair of transversely spaced electrodes extending longitudinally along said belt upper run.

Another feature of the subject apparatus resides in the structure of the electrodes which are perforate along at least part of their lengths and are provided with means for maintaining them at a predetermined temperature to assure a uniform low impedance electrical contact with the advancing treated material, specifically a viscose sponge forming mass containing reinforcing fibers and sodium sulphate decahydrate pore forming crystals. Still another important feature of the present apparatus and method is in the arrangement for feeding the fibrous web into anchored overlying relationship with the advancing sponge forming mass disposed directly above the belt trailing section and having a front opening formed therein. A variable speed positive driven roller registers with the hopper front opening and is rotated at a peripheral speed less than rate of advance of the conveyor belt. An adjustable panel or apron is provided in registry with the opening to permit the varying of the height thereof and hence the peripheral exposure of the roller to the hopper interior.

In accordance with a preferred form of the present apparatus, the belt is advanced along an upper run supported by an underlying surface which is flat along the trailing section of the upper run and is thereafter crowned, the height of the crown increasing as it is approaching the leading end of the belt upper run to impart a corresponding crowned shape to the advancing belt. The elongated electrodes are disposed along the side borders of the belt upper run and are imperforate along the trailing part of the run. The electrodes have superimposed on their outer faces a water absorbent material and a pipe extends along the top of each electrode and has bottom openings formed therein directed toward the absorbent material. The pipes are connected to a source of water to continuously wet the absorbent material, the overflow water falling into channels bordering the belt.

Referring now to the drawings which illustrate a preferred embodiment of the present invention, the reference numeral 10 generally designates the improved apparatus which comprises a support frame 11 including a pair of opposite parallel longitudinally extending structural support members 12 which are suitably mounted atop upright legs and are interconnected by longitudinally spaced cross angle members 13. Mounted between the longitudinal structural member 12 and supported on the cross member 13 is a conveyor base member 14 which extends along a major part of the apparatus 10. The base member 14, although illustrated as and being preferably fully formed of a chemical resistant electrical insulating material of any well-known type, may have only its upper surfaces formed of such material.

The base member 14 includes a pair of transversely spaced longitudinally extending, parallel, vertical end support plates 16 and a longitudinally extending, substantially horizontal base plate 17 supported by and between the end plates 16 along substantially the medial levels thereof. The top face 18 of the base plate 17 defines a conveyor belt support surface which imparts a corresponding configuration to the run of a conveyor belt traversing the length thereof. The guide surface 18 varies in transverse cross section along the length thereof the first, or trailing section 20 constituting a minor fraction of the overall length of the surface 19 being of a flat horizontal contour. The remainder of the base plate top face 19 is transversely crowned, the apex of the crown being medially located between the side edges of the base plate 16, and, while the crown surface is preferably of transverse arcuate configuration, it may be of any other configuration in which the side faces are downwardly inclined from an apex. The crown height of the surface 19 gradually increases along the length of the section 21 which follows the section 20 for a major part of the length of the support plate 19 and terminates in a small leading section 22 of substantially uniform transverse cross section. It should be noted that the side edges 23 of the support surface 21 are spaced inwardly from the side plates 16 and extend horizontally at a common level. A pair of transversely spaced longitudinally extending channels 24 is formed in he base member 14 bordering opposite sides of the support surface 19, the bottom faces of the channels 24 being forwardly downwardly inclined and terminating in overflow wires 26. The optimum height of the crown of the support surface 19 and the variation of such height along the length of surface 19 depends on the characteristics of the properties of the sponge forming mass being treated, the speed of advance, and other operating parameters. It has been found, for example, that excellent results are achieved in the coagulation of a layer viscose sponge forming mass of the composition described in the aforesaid patents and patent applications, the layer having a height of about ¾ inch and a width of about 36 inches and conveyed at a rate of about 5½ inches per minute, the length of the surface 19 being about 12 feet with maximum crown height of about 2 inches desirable, and can be used under a broad range of parameters. The height of the crown increases substantially uniformly from the leading edge of the flat section 20 to its maximum height at the leading edge of the intermediate section 21 and thereafter the height of the crown remains unchanged, to the edge of the surface 19, for example for about 15 inches, the radius of curvature correspondingly decreasing to about 8 feet. The above parameters are highly suitable over a wide range of operating conditions and sponge layer thicknesses.

Supported by and journalled between the longitudinal frame member 12 at points rearward and forward of the trailing and leading ends of the support member 14 are rear and front transversely extending drums 27 and 28, respectively, the drums being mounted by means of shafts 29 and 30. The upper edges of the drums 27 and 28 are approximately at the level of the support surface 19. A conveyor belt 32 of substantially the width of the support surface 19 is supported by and between the drums 27 and 28 and includes an upper run 33 which extends from the upper edge of the trailing drum 27 to the support surface 19 and rest upon and along the support surface 19 to and around the leading drum 28. The belt 32 is tensioned in any suitable manner so that along the upper run 33 it assumes the shape of the support surface 19 along which it advances. A flat guide plate 34 extends tangentially from the upper surface of the trailing drum 27 to the support surface 19 and underlies and supports the belt 32 along the trailing end of the upper run 33. The belt 32 is formed of any suitable, flexible, chemical resistant and temperature resistant material, advantageously a cord-reinforced natural or synthetic rubber.

Affixed to the ends of the shafts 29 and 30 are gears 36 which are disposed outside the corresponding longitudinal frame member 12. A longitudinally extending drive shaft 37 is rotatably mounted on the frame member 12 and terminates in worm gears which mesh the gears 36. The shaft 37 carries a sprocket wheel 38 between its ends which is connected by way of a suitable sprocket chain to a drive sprocket wheel mounted on the output shaft of a motor driven gear reduction unit in any suitable manner whereby to drive the drums 27 and 28 at a common peripheral speed and advance the belt 32 along the upper run 33.

A hopper 39 is suitably supported immediately above the belt upper run 33 in the area of the trailing part of the underlying support plate 34. The hopper 39 includes a rear wall 40 terminating at its bottom in a downwardly forwardly inclined section 41 which extends substantially to the top surface of the belt upper run 33 and delineates the rear edge of the hopper bottom opening. The hopper includes a transversely extending vertical front wall 42 which terminates in a forwardly upwardly inclined bottom face 43 disposed at a distance above the belt upper run 33. The hopper 39 is of a width somewhat less that of the belt 32 and is closed by end walls. A transversely extending horizontal feed roller 44 terminates at opposite ends in stub shafts 45 which are journalled to side blocks 46, the roller 44 registering with the front opening of the hopper 39 whose upper edge is delineated by the support shaft 43. One of the stub shafts 45 is coupled through a variable speed unit 47 to the drive shaft 37 whereby the roller 44 may be driven in synchronism with the belt 32 at adjustable peripheral speeds relative thereto. The peripheral speed of the roller 44 is advantageously less than the speed of advance of the belt 32 along the upper run 33 and is advantageously between ½% and 10% slower than the speed of advance of the belt 32.

Supported along the front lower rear face of the hopper front wall 42 and extending for the full width thereof is a flexible web 48 which may be formed of saran, polyethylene or the like. The web 48 extends below the lower edge of the hopper wall bottom face 43 and is securely engaged along the upper border thereof for substantially its full width by a channel-shaped clamp member 49 provided with a pair of transversely spaced forwardly directed studs 50. The studs 50 register with vertical slots 51 formed in the hopper front wall 42 and are engaged by washers and nuts 52 to releasably lock the panel 48 at any preselected level. Thus the height of the front opening in the hopper 39 and hence the area of exposure of the web advanced by the roller 44 may be adjusted by raising or lowering of the web panel 48. This permits the control of the penetration of the sponge forming mass into the fibrous web without varying the characteristics of the sponge forming mass or the pressure thereon, as will be hereinafter set forth.

A pair of oppositely disposed parallel channel-shaped bus bars 53 of high electrical conductivity is mounted on and secured to the top face of the base side plates 16 by means of screws 54 passing through corresponding openings in the channel webs and the respective bars are connected by cables 55 to the opposite terminals of a source of alternating current. The bus bars 53 extend for substantially the full length of the side plates 16 and support a plurality of regularly longitudinally spaced mounting brackets 56. Each of the mounting brackets 56 comprises a transversely extending threaded rod 57 engaging a pair of aligned corresponding openings formed in the upright flanges of the channel member 53 and adjustably transversely secured thereto by a pair of nuts 58 engaging the threaded rod 57 and bearing on the outer faces of the channel flanges. Each of the rods 57 projects inwardly of the corresponding channel member 53 and terminates in a depending mounting block 59.

A pair of transversely spaced longitudinally extending electrodes 60 are attached to corresponding mounting blocks 59 by means of screws 61 which register with vertical slots in the blocks 59 and engage tapped openings in the electrodes 60 whereby each of the electrodes 60 is electrically connected to and supported by a corresponding channel member 53. Each of the electrodes 60 extends for substantially the full length of the base member 90 and is defined by an elongated metal plate including a vertical leg 63 terminating at its top in an inwardly upwardly directed flange 64. The position of the electrodes 60 may thus be varied and are vertically and transversely adjusted by means of the screws 59 and nuts 58 so that the lower edges substantially abut the upper run 33 of the belt 32 and is substantially equally spaced along the transverse surface of the belt along the full length thereof. Thus, as the crown of the belt increases, the horizontal distance between the electrods 69 decrease so as to compensate for the crowning of the belt.

Formed in the electrode 60 along the bottom border of the legs 63 are regularly spaced openings 65 which extend from the bottom edges of the electrodes 60 to a point approximately intermediate the upper and lower edges of the legs 63. The trailing ends of the electrodes 60 for approximately the length of the trailing table section 20 are substantially imperforate and the spacing between successive openings 65 a short distance following the trailing section 20 is greater than the spacing between sucessive openings 65 along the remaining electrodes 60.

In order to control the temperature of the electrodes 60 and thereby maintain a low resistance uniform electrical contact between the electrodes 60 and the transported sponge forming mass, there is suitably positioned on the outer face of each of the electrodes 60 and in intimate contact therewith, a web 66 formed of a highly water absorbent material such as regenerated cellulose sponge cloth, a felt, woven fabric or other suitable water absorbent material. The web 66 extends from a line approximately along the upper edges of the openings 65 substantially to the upper edge of the flange 64. A pipe 67, preferably formed of an organic plastic material, is disposed along the top face of the flange 64 and has formed along the bottom thereof a plurality of regularly spaced openings 68 which are directed toward the upper border of the web 66. The pipes 67 are retained on the flange 64 by means of regularly spaced clip elements 69 each of which includes an arcuate section 70 engaging the pipe 67 and a depending clamp section which includes a resilient leg 71 engaging the underface of the flange 64 to thereby clamp the pipe 67 to the flange 64. Each of the pipes 67 has one end closed and the other end connected by way of an adjustable flow control valve 72 to a source of cold water, preferably below 25° C.

Considering now the operation of the apparatus described above, the hopper 39 is filled and maintained at a predetermined level with a viscose sponge forming mass S having dispersed therein as a pore former, crystals of sodium sulphate decahydrate. The composition of the sponge forming mass S and the level thereof in the hopper 39 is as described in the above-identified patent applications. A web W of a lofty non-woven fibrous material, likewise as described in the above-identified patent and patent applications, it suitably guided from a roll thereof around the trailing surface of the roller 44 and along the front face of the flexible panel 48. The belt 32 is advanced along its upper run 33 and the speed of the roller 44 is adjusted by means of the variable speed unit 47 so as to have a peripheral speed less than that of the belt 32 and preferably between ½% and 10% less, for example, 4½%. As the belt 32 advances along its upper run, a layer L of sponge forming mass is disposed thereon and the web W is superimposed upon the advancing layer L with the web fibers at the interface of the web W and the layer L being imbedded in the layer L. The depth of penetration of the fibers at the web layer interface and the penetration of the sponge forming mass into the web W may be adjusted by raising or lowering the panel 48 to correspondingly increase and decrease the depth of interpenetration by regulating the time of exposure of the web W to the sponge forming mass S under the hopper pressure. The advance of the web W by the roller 44 at a lesser peripheral speed than the advance of the belt 32 assures the uniform flat application of the web W on the layer L.

The electrodes 60 are connected to a source of alternating current of the values set forth in the above-identified patent applications to effect the passage of currents transversely through the layer L and hence the heating and coagulation of the layer L. As the layer L traverses the trailing section 20 there is a gradual increase in the temperature of the layer with little or no melting of the sodium sulphate crystals. The sodium sulphate crystals begin to melt and form a liquid during the first part of the section 21 and at a short distance before the midpoint thereof all the sodium sulphate crystals are melted and the temperature of the mass approaches the boiling point. During the passage of the layer L along the leading half of the section 21 and along section 22, heavy boiling is observed which is followed by drying activity in the area of the leading section 22 and the leading end of the intermediate section 21. The liquid evolved from the heated layer L flows through the electrode openings 65 into the side channels 24 along which it flows to suitable discharge means. The flow of the liquid from the advancing layer L is radically effected by the crowning of the belt upper run 33 as it advances so that the advancing layer L is of substantially uniform temperature across the width thereof and as a consequence a uniform end product of high quality is produced.

The water valves 72 are adjusted to maintain a flow of water into the webs 66 so as to maintain the temperature of the electrodes 60 at below 100° C. and preferably at a temperature of between 32° C. and 60° C. It has been found that under the above conditions of the electrodes 60 the formation of crystals at the interface of the electrodes 60 and the layer L is virtually eliminated so that a good electrical contact is uniformly effected between the layer L and the electrodes 60 along the full lengths thereof. Furthermore, the water flowing from the webs 66 washes the area of the electrodes free of any crystals of sodium sulphate which may tend to form thereon, to further assure continuous good contact between the electrodes 60 and the layer L. The water flows from the web 66 and with the dissolved salts falls into the channels 24 and assists in maintaining a free flow in the channels 24. The coagulated layer L and web W anchored thereto leave the conveyor belt 32 and are then washed, handled and treated in any suitable manner.

While there has been described and illustrated a preferred embodiment of the present invention, it is apparent that numerous alterations, omissions and additions may be made without departing from the spirit thereof.

What is claimed is:

1. A regenerated cellulose sponge producing apparatus comprising an endless conveyor belt having a longitudinally extending upper run with a section thereof downwardly transversely inclined approaching a longitudinal edge of said conveyor belt and including a trailing section and a leading section, means for advancing said belt longitudinally along said upper run from said trailing section toward said leading section, means for depositing a layer of an electrically conducting sponge forming mass on said belt at said trailing section, and a pair of transversely spaced electrodes connected to a source of current and extending longitudinally along said belt upper run and adapted to electricaly engage opposite longitudinal edges of said mass layer upon said belt along said transversely inclined run to effect the internal electrical heating thereof said transverse inclination of said conveyor belt providing a drainage of liquid from said mass layer to promote a uniform heating across the width of said mass layer.

2. A regenerated cellulose sponge producing apparatus comprising an endless conveyor belt having an upper run extending longitudinally from a trailing section to a leading section, means for advancing said belt along said upper run from said trailing section toward said leading section, means transversely upwardly crowning said conveyor belt along said upper run between said trailing and leading sections, means for depositing a layer of an electrically conducing cellulosic sponge forming mass to be treated on said belt upper run, and a pair of transversely spaced electrodes connected to a source of current and extending longitudinally along opposite borders of said belt upper run and directed upwardly therefrom and adapted to electrically engage opposite longitudinal edges of said sponge forming mass layer upon said belt along said upwardly crowned run to effect the internal electrical heating of said layer, said transverse crowning of said conveyor belt providing a drainage of liquid from said mass layer to promote a uniform heating across the width of said mass layer.

3. The apparatus of claim 2, wherein said electrodes are perforate along the lower border thereof.

4. A material treating apparatus comprising an endless conveyor belt having a longitudinally extending transversely upwardly crowned upper run and including a trailing section and a leading section means for advancing said belt along said upper run from said trailing section toward said leading section, means for depositing a material on said belt at said trailing section, a pair of transversely spaced electrodes extending longitudinally along said belt upper run, and means for cooling said electrodes.

5. The apparatus of claim 2, wherein the crown of said belt along said upper run increases in height from the trailing section to the leading section of said belt upper run.

6. The apparatus of claim 5, wherein the trailing section of said belt along said upper run is substantially flat.

7. The apparatus of claim 2, wherein said sponge forming mass depositing means comprises a hopper disposed above said belt upper run adjacent to said trailing section and having a transversely extending downwardly directed bottom opening closely spaced from the upper face of said belt upper run.

8. The apparatus of claim 7, wherein said hopper includes a forwardly directed front wall having a transverse front opening formed along the bottom thereof in communication with said bottom opening and comprising a transversely extending guide roller registering with said front opening.

9. The apparatus of claim 7, wherein said hopper includes a forwardly directed front wall having a transverse front opening formed along the bottom thereof in communication with said bottom opening and comprising a transversely extending guide roller registering with said front opening, and means for adjusting the height of said front opening.

10. The apparatus of claim 7, wherein said hopper includes a forwardly directed front wall having a transverse front opening formed along the bottom thereof in communication with said bottom opening and comprising a transversely extending guide roller registering with said front opening, and means for driving said roller at a lesser peripheral speed than the linear rate of advance of said belt along said upper run.

11. The apparatus of claim 2, wherein said electrodes are imperforate along the trailing section of said upper run and perforate along the bottom border of the remainder thereof.

12. A material treating apparatus comprising an endless conveyor belt having a longitudinally extending upper run including a trailing section and a leading section, means for advancing said belt along said upper run from said trailing section toward said leading section, means for depositing a material on said belt at said trailing section, and a pair of transversely spaced upwardly directed electrode defining plates extending longitudinally along said belt upper run and having confronting inner faces and opposite outer faces, a water absorbent web superimposed on said electrode outer faces and means for applying water to the upper portions of said webs along the lengths thereof.

13. The material treating apparatus of claim 12, comprising upwardly inwardly inclined flanges formed along the top edges of said electrode plates, said water applying means including a pipe supported along each of said flanges and having openings formed therein directed toward said webs.

14. A material treating apparatus comprising an endless conveyor belt having a longitudinally extending upper run including a trailing section and a leading section, means for advancing said belt along said upper run from said trailing section toward said leading section, a hopper for containing a sponge forming mass disposed above said belt upper run trailing section and having a front wall provided with a transversely extending forwardly directed opening disposed directly above said belt upper run, a transversely extending roller registering with said forwardly directed opening and having a rear face exposed to the interior of said hopper means for guiding a fibrous web about the rear face of said roller, a transversely extending panel mounted on the inner face of said hopper front wall and projecting below the lower edge of said front wall and spaced rearwardly of said rear face of said roller, and means for vertically adjusting the height of the lower edge of said panel whereby to vary the interpenetration of said sponge forming mass and said web.

15. The treating apparatus of claim 14, wherein said panel is formed of a pliable material.

16. The apparatus of claim 14 including means for rotating said roller at a lesser peripheral speed than the lineal speed of said belt.

17. The material treating apparatus of claim 16, including means for varying the speed of said roller relative to the speed of advance of said belt.

18. A regenerated cellulose sponge producing apparatus comprising a longitudinally extending base member having a transversely upwardly crowned top face, an endless conveyor belt having an upper run extending longitudinally along said top face and correspondingly shaped thereby, means for advancing said belt longitudinally along said upper run, means for depositing a layer of an electrically conducting cellulosic sponge forming mass on said belt at a trailing section of said upper run, and a pair of transversely spaced electrodes connected to a source of current and extending longitudinally along said belt upper run and adapted to engage opposite longitudinal edges of said mass layer upon said belt along said upwardly crowned run to effect the internal electrical heating thereof, said transverse crowning of said belt providing a drainage of liquid from said mass layer to promote a uniform heating across the width of said mass layer.

References Cited by the Examiner

UNITED STATES PATENTS

| | | | |
|---|---|---|---|
| 2,861,009 | 11/1958 | Rubner | 156—77 X |
| 2,889,704 | 8/1959 | Pekarek. | |
| 3,046,177 | 7/1962 | Hankins | 156—78 X |
| 3,048,888 | 8/1962 | Shockley et al. | 264—27 |
| 3,109,703 | 11/1963 | Politzer et al. | 264—27 |
| 3,142,714 | 7/1964 | Politzer et al. | 264—27 |
| 3,166,454 | 1/1965 | Voelker | 156—78 |

FOREIGN PATENTS 479,107  12/1951  Canada.

EARL M. BERGERT, *Primary Examiner.*

CLIFTON B. COSBY, *Examiner.*